United States Patent
Lin et al.

(10) Patent No.: US 9,692,652 B2
(45) Date of Patent: Jun. 27, 2017

(54) FRAMEWORK FOR RELIABLY COMMUNICATING PORT INFORMATION IN A SYSTEM OF DEVICES

(71) Applicant: BROCADE COMMUNICATIONS SYSTEMS, INC., San Jose, CA (US)

(72) Inventors: Kwun-Nan Kevin Lin, Saratoga, CA (US); Aseem Rastogi, Fremont, CA (US); Mike Lin Wang, Santa Clara, CA (US); Dheeraj Reddy, Fremont, CA (US); Ravi Swamy, Santa Clara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 79 days.

(21) Appl. No.: 14/485,343

(22) Filed: Sep. 12, 2014

(65) Prior Publication Data

US 2015/0288567 A1     Oct. 8, 2015

Related U.S. Application Data

(60) Provisional application No. 61/974,924, filed on Apr. 3, 2014.

(51) Int. Cl.
*H04L 12/24*     (2006.01)
*H04L 12/939*     (2013.01)
(Continued)

(52) U.S. Cl.
CPC ........ *H04L 41/0856* (2013.01); *H04L 49/555* (2013.01); *H04L 49/557* (2013.01); *H04L 49/30* (2013.01); *H04L 49/70* (2013.01)

(58) Field of Classification Search
CPC ... H04L 41/0856; H04L 49/30; H04L 49/557; H04L 49/555; H04L 49/70
See application file for complete search history.

(56) References Cited

U.S. PATENT DOCUMENTS

| 4,625,308 A | 11/1986 | Kim et al. |
| 5,481,073 A | 1/1996 | Singer et al. |

(Continued)

FOREIGN PATENT DOCUMENTS

| EP | 2924927 A1 | 9/2015 |
| WO | 2015026950 A1 | 2/2015 |

OTHER PUBLICATIONS

International Search Report and Written Opinion for International Appln. No. PCT/US2014/051903 dated Jan. 27, 2015, 16 pages.

(Continued)

*Primary Examiner* — Alpus H Hsu
*Assistant Examiner* — Anthony Luo
(74) *Attorney, Agent, or Firm* — Fountainhead Law Group P.C.

(57) ABSTRACT

A framework for reliably communicating port information in a system of devices is provided. In one embodiment, each device in the system of devices can create a first record that includes port information pertaining to a plurality of ports of the device, where the plurality of ports are usable for communicatively coupling the device to other devices in the system of devices. The device can further receive, from the other devices in the system of devices, one or more second records including port information pertaining to the ports of the other devices, and can store the first record and the one or more second records in a data store maintained locally on the device. The device can then forward copies of the first record and the one or more second records out of each of the plurality of ports, thereby causing the copies of the first record and the one or more second records to be communicated to the other devices in the system of devices.

18 Claims, 12 Drawing Sheets

(51) Int. Cl.
  *H04L 12/935* (2013.01)
  *H04L 12/931* (2013.01)

(56) References Cited

U.S. PATENT DOCUMENTS

| | | | |
|---|---|---|---|
| 5,651,003 A | 7/1997 | Pearce et al. | |
| 6,111,672 A | 8/2000 | Davis et al. | |
| 6,243,756 B1 | 6/2001 | Whitmire et al. | |
| 6,366,582 B1 | 4/2002 | Nishikado et al. | |
| 6,373,840 B1 | 4/2002 | Chen | |
| 6,490,276 B1 | 12/2002 | Salett et al. | |
| 6,496,502 B1 | 12/2002 | Fite, Jr. et al. | |
| 6,516,345 B1 | 2/2003 | Kracht | |
| 6,526,345 B2 | 2/2003 | Ryoo | |
| 6,597,658 B1 | 7/2003 | Simmons | |
| 6,725,326 B1 | 4/2004 | Patra et al. | |
| 6,765,877 B1 | 7/2004 | Foschiano et al. | |
| 6,807,182 B1 | 10/2004 | Dolphin et al. | |
| 6,839,342 B1 | 1/2005 | Parham et al. | |
| 6,839,349 B2 | 1/2005 | Ambe et al. | |
| 6,850,542 B2 | 2/2005 | Tzeng | |
| 7,093,027 B1 | 8/2006 | Shabtay et al. | |
| 7,099,315 B1 | 8/2006 | Ambe et al. | |
| 7,106,736 B2 | 9/2006 | Kalkunte | |
| 7,136,289 B2 | 11/2006 | Vasavda et al. | |
| 7,184,441 B1 | 2/2007 | Kadambi et al. | |
| 7,206,283 B2 | 4/2007 | Chang et al. | |
| 7,206,309 B2 | 4/2007 | Pegrum et al. | |
| 7,274,694 B1 | 9/2007 | Cheng et al. | |
| 7,313,667 B1 | 12/2007 | Pullela et al. | |
| 7,327,727 B2 | 2/2008 | Rich et al. | |
| 7,336,622 B1 | 2/2008 | Fallis et al. | |
| 7,426,179 B1 | 9/2008 | Harshavardhana et al. | |
| 7,480,258 B1 | 1/2009 | Shuen et al. | |
| 7,496,096 B1 | 2/2009 | Dong et al. | |
| 7,523,227 B1 | 4/2009 | Yager et al. | |
| 7,565,343 B2 | 7/2009 | Watanabe | |
| 7,602,787 B2 | 10/2009 | Cheriton | |
| 7,697,419 B1 | 4/2010 | Donthi | |
| 7,933,282 B1 | 4/2011 | Gupta et al. | |
| 8,209,457 B2 | 6/2012 | Engel et al. | |
| 8,307,153 B2 | 11/2012 | Kishore | |
| 8,750,144 B1 | 6/2014 | Zhou et al. | |
| 8,949,574 B2 | 2/2015 | Slavin | |
| 9,032,057 B2 | 5/2015 | Agarwal et al. | |
| 9,038,151 B1 | 5/2015 | Chua et al. | |
| 9,148,387 B2 | 9/2015 | Lin et al. | |
| 9,185,049 B2 | 11/2015 | Agarwal et al. | |
| 9,269,439 B1 | 2/2016 | Levy et al. | |
| 9,282,058 B2 | 3/2016 | Lin et al. | |
| 9,313,102 B2 | 4/2016 | Lin et al. | |
| 9,559,897 B2 | 1/2017 | Lin et al. | |
| 9,577,932 B2 | 2/2017 | Ravipati et al. | |
| 2001/0042062 A1 | 11/2001 | Tenev et al. | |
| 2002/0046271 A1 | 4/2002 | Huang | |
| 2002/0101867 A1 | 8/2002 | O'Callaghan et al. | |
| 2003/0005149 A1 | 1/2003 | Haas et al. | |
| 2003/0169734 A1 | 9/2003 | Lu et al. | |
| 2003/0174719 A1 | 9/2003 | Sampath et al. | |
| 2003/0188065 A1 | 10/2003 | Golla et al. | |
| 2005/0063354 A1 | 3/2005 | Garnett et al. | |
| 2005/0141513 A1 | 6/2005 | Oh et al. | |
| 2005/0198453 A1* | 9/2005 | Osaki | G06F 3/0617 |
| | | | 711/162 |
| 2005/0243739 A1 | 11/2005 | Anderson et al. | |
| 2005/0271044 A1 | 12/2005 | Hsu et al. | |
| 2006/0013212 A1 | 1/2006 | Singh et al. | |
| 2006/0023640 A1 | 2/2006 | Chang et al. | |
| 2006/0072571 A1 | 4/2006 | Navada et al. | |
| 2006/0077910 A1 | 4/2006 | Lundin et al. | |
| 2006/0080498 A1 | 4/2006 | Shoham et al. | |
| 2006/0092849 A1 | 5/2006 | Santoso et al. | |
| 2006/0092853 A1 | 5/2006 | Santoso et al. | |
| 2006/0176721 A1 | 8/2006 | Kim et al. | |
| 2006/0187900 A1 | 8/2006 | Akbar | |
| 2006/0253557 A1 | 11/2006 | Talayco et al. | |
| 2006/0280125 A1* | 12/2006 | Ramanan | H04L 29/12254 |
| | | | 370/252 |
| 2006/0294297 A1 | 12/2006 | Gupta | |
| 2007/0081463 A1 | 4/2007 | Bohra et al. | |
| 2007/0121673 A1* | 5/2007 | Hammer | H04L 41/026 |
| | | | 370/468 |
| 2007/0174537 A1 | 7/2007 | Kao et al. | |
| 2008/0137530 A1 | 6/2008 | Fallis et al. | |
| 2008/0192754 A1 | 8/2008 | Ku et al. | |
| 2008/0259555 A1 | 10/2008 | Bechtolsheim et al. | |
| 2008/0275975 A1 | 11/2008 | Pandey et al. | |
| 2008/0281947 A1 | 11/2008 | Kumar | |
| 2009/0125617 A1 | 5/2009 | Klessig et al. | |
| 2009/0135715 A1 | 5/2009 | Bennah | |
| 2009/0141641 A1* | 6/2009 | Akahane | H04L 1/24 |
| | | | 370/242 |
| 2010/0172365 A1 | 7/2010 | Baird et al. | |
| 2010/0182933 A1 | 7/2010 | Hu et al. | |
| 2010/0185893 A1 | 7/2010 | Wang et al. | |
| 2010/0257283 A1 | 10/2010 | Agarwal | |
| 2010/0284414 A1 | 11/2010 | Agarwal et al. | |
| 2010/0293200 A1* | 11/2010 | Assarpour | H04L 45/00 |
| | | | 707/802 |
| 2010/0329111 A1 | 12/2010 | Wan et al. | |
| 2011/0238923 A1 | 9/2011 | Hooker et al. | |
| 2011/0268123 A1 | 11/2011 | Kopelman et al. | |
| 2012/0020373 A1* | 1/2012 | Subramanian | H04L 45/58 |
| | | | 370/419 |
| 2012/0087232 A1* | 4/2012 | Hanabe | H04L 41/0659 |
| | | | 370/217 |
| 2012/0155485 A1* | 6/2012 | Saha | H04L 12/5696 |
| | | | 370/419 |
| 2012/0246400 A1 | 9/2012 | Bhadra et al. | |
| 2013/0170495 A1 | 7/2013 | Suzuki et al. | |
| 2013/0201984 A1 | 8/2013 | Wang | |
| 2013/0215791 A1 | 8/2013 | Lin et al. | |
| 2013/0232193 A1 | 9/2013 | Ali et al. | |
| 2013/0262377 A1 | 10/2013 | Agarwal | |
| 2014/0003228 A1 | 1/2014 | Shah et al. | |
| 2014/0006706 A1 | 1/2014 | Wang | |
| 2014/0071985 A1 | 3/2014 | Kompella et al. | |
| 2014/0075108 A1 | 3/2014 | Dong et al. | |
| 2014/0112190 A1 | 4/2014 | Chou et al. | |
| 2014/0112192 A1 | 4/2014 | Chou et al. | |
| 2014/0122791 A1 | 5/2014 | Fingerhut | |
| 2014/0126354 A1 | 5/2014 | Hui et al. | |
| 2014/0153573 A1 | 6/2014 | Ramesh et al. | |
| 2014/0181275 A1 | 6/2014 | Lin et al. | |
| 2014/0269402 A1 | 9/2014 | Vasseur et al. | |
| 2014/0314082 A1* | 10/2014 | Korpinen | H04L 45/70 |
| | | | 370/392 |
| 2014/0334494 A1 | 11/2014 | Lin et al. | |
| 2014/0341079 A1 | 11/2014 | Lin et al. | |
| 2014/0341080 A1 | 11/2014 | Lin et al. | |
| 2014/0376361 A1 | 12/2014 | Hui et al. | |
| 2015/0016277 A1 | 1/2015 | Smith et al. | |
| 2015/0036479 A1 | 2/2015 | Gopalarathnam | |
| 2015/0055452 A1 | 2/2015 | Lee | |
| 2015/0117263 A1 | 4/2015 | Agarwal et al. | |
| 2015/0124826 A1 | 5/2015 | Edsall et al. | |
| 2015/0229565 A1 | 8/2015 | Ravipati et al. | |
| 2015/0281055 A1 | 10/2015 | Lin et al. | |
| 2016/0028652 A1 | 1/2016 | Agarwal et al. | |
| 2016/0173332 A1 | 6/2016 | Agarwal et al. | |
| 2016/0173339 A1 | 6/2016 | Lin et al. | |

OTHER PUBLICATIONS

Final Office Action Dated Feb. 13, 2015; U.S. Appl. No. 13/850,118; (2120-04201) (14 p.).

Amendment to Carrier Multiple Access with Collision Detection (CSMA/CD Access Method and Physical Layer Specifications—Aggregation of Multi[ple Link Segments; IEEE Std. 802.3ad; 2000; 183 pages.

Appeal Brief Dated Jan. 18, 2013; U.S. Appl. No. 12/463,964 (2120-04200) (23p.).

(56) References Cited

OTHER PUBLICATIONS

BROCADE: "FastIron Ethernet Switch"; Administration Guide; Supporting FastIron Software Release 08.0.00; Apr. 30, 2013; 400 pages.
BROCADE: "FastIron Ethernet Switch"; IP Multicast Configuration Guide; Supporting FastIron Software Release 08.0.00; Apr. 30, 2013; 212 pages.
BROCADE: "FastIron Ethernet Switch"; Stacking Configuration Guide; Supporting FastIron Software Release 08.0.00; Apr. 30, 2013; 170 pages.
BROCADE: "FastIron Ethernet Switch"; Traffic Management Guide; Supporting FastIron Software Release 08.0.00; Apr. 30, 2013; 76 pages.
Cisco: "Cisco StackWise and StackWise Plus Technology"; technical white paper; C11-377239-01; Oct. 2010; Copyright 2010; 11 pages.
Cisco: "Delivering High Availability in the Wiring Closet with Cisco Catalyst Switches"; technical white paper; C11-340384-01; Jan. 2007; Copyright 1992-2007; 8 pages.
Configure, Verify, and Debug Link Aggregation Control Program (LACP); allied Telesyn; 2004; 10 pages.
Dell: "Stacking Dell PowerConnect 7000 Series Switches"; A Dell Technical White Paper; Jul. 2011; 34 pages.
International Search Report and Written Opinion for International Appln. No. PCT/US2013/076251 dated May 22, 2014, 11 pages.
Examiner's Answer Dated May 7, 2013; U.S. Appl. No. 12/463,964 (2120-4200) (12 p.).
Extreme Networks Technical Brief: "SummitStack Stacking Technology"; 1346_06; Dec. 2010; 8 pages.
Final Office Action Dated Jan. 23, 2012; U.S. Appl. No. 12/463,964 (2120-04200) (11 p.).
Fischer et al.: "A Scalable ATM Switching System Architecture"; IEEE Journal on Selected Areas in Communications, IEEE Service Center, Piscataway, US, vol. 9, No. 8, Oct. 1, 1991; pp. 1299-1307.
U.S. Appl. No. 61/974,924, filed Apr. 3, 2014 by Lin et al.
Juniper Networks datasheet entitled: "Juniper Networks EX 4200 Ethernet Switches with Virtual Chassis Technology"; Dated Aug. 2013 (2120-04300) (12 p.).
U.S. Appl. No. 61/898,295, filed Oct. 31, 2013 by Agarwal.
Link Aggregation According to IEEE Standard 802.3ad; SysKonnect GmbH; 2002; 22 pages.
Link Aggregation; http://en.wikipedia.org/wiki/Link_aggregation; downloaded from Internet on Dec. 16, 2013; 9 pages.
U.S. Appl. No. 61/971,429, filed Mar. 27, 2014 by Sinha et al.
U.S. Appl. No. 61/938,805, filed Feb. 12, 2014 by Ravipati et al.
Office Action dated Mar. 21, 2011; U.S. Appl. No. 12/463,964 (2120-04200) (10 P.).
Partial International Search Report for PCT/US2014/051903 dated Nov. 18, 2014.
Reply Brief Dated Jul. 8, 2013; U.S. Appl. No. 12/463,964 (2120-04200) (14 p.).
Response to Office Action Dated Mar. 21, 2011; U.S. Appl. No. 12/463,964; Response filed Sep. 21, 2011 (2120-04200) (12 p.).
Suckfuell: "Evolution of EWSD During the Eighties", Institute of Electrical and Electronics Engineers; Global Telecommunications Conference; San Diego; Nov. 28-Dec. 1, 1983; [Global Telecommunications Conference], New York, IEEE, US, vol. 2, Nov. 1, 1983; pp. 577-581.
U.S. Appl. No. 14/171,152, filed Feb. 3, 2014 by Lin et al.
U.S. Appl. No. 14/207,146, filed Mar. 12, 2014 by Lin et al.
U.S. Appl. No. 14/094,931, filed Dec. 3, 2013 by Lin et al.
U.S. Appl. No. 14/268,507, filed May 2, 2014 by Agarwal. (Unpublished).
U.S. Appl. No. 14/463,419, filed Aug. 19, 2014 by Lee. (Unpublished).
U.S. Appl. No. 14/506,943, filed Oct. 6, 2014 by Lin et al. (Unpublished).
U.S. Appl. No. 14/106,302, filed Dec. 13, 2013 by Lin et al.
U.S. Appl. No. 14/530,193, filed Oct. 31, 2014 by Ravipati et al. (Unpublished).
U.S. Appl. No. 61/745,396, filed Dec. 21, 2012 by Lin et al.
U.S. Appl. No. 61/799,093, filed Mar. 15, 2013 by Lin et al.
U.S. Appl. No. 61/822,216, filed May 10, 2013 by Lin et al.
U.S. Appl. No. 61/825,449, filed May 20, 2013 by Lin et al.
U.S. Appl. No. 61/825,451, filed May 20, 2013 by Lin et al.
U.S. Appl. No. 61/868,982, filed Aug. 22, 2013 by Lee.
Office Action Dated Jul. 16, 2015; U.S. Appl. No. 14/094,931; (41 pgs.)
Extended European Search Report dated Jul. 30, 2015 for EP Appln. 15000834.0; 8 pages.
Pei et al.: "Putting Routing Tables in Silicon", IEEE Network, IEEE Service Center, New York, NY; vol. 6, No. 1, Jan. 1, 1992; pp. 42-50.
Hsiao et al.: "A High-Throughput and High-Capacity IPv6 Routing Lookup System", Computer Networks, Elsevier Science Publishers B.V., Amsterdam, NL, vol. 57, No. 3, Nov. 16, 2012, pp. 782-794.
Notice of Allowance dated Aug. 3, 2015; U.S. Appl. No. 14/207,146 (38 pgs.).
Notice of Allowance dated Sep. 17, 2015; U.S. Appl. No. 14/268,507 (15 pgs.).
U.S. Appl. No. 14/876,639, filed Oct. 6, 2015 by Agarwal et al.
Notice of Allowance dated Oct. 30, 2015; U.S. Appl. No. 13/850,118 (2120-04201) (12 pgs.).
Response to Office Action Dated Jul. 16, 2015; U.S. Appl. No. 14/094,931; Response filed Nov. 12, 2015 (13 p.).
Office Action Dated Nov. 20, 2015; U.S. Appl. No. 14/106,302; (14 pgs.).
Notice of Allowance dated Dec. 14, 2015; U.S. Appl. No. 14/094,931 (25 pgs.).
U.S. Appl. No. 14/869,743, filed Sep. 29, 2015 by Agarwal et al.
U.S. Appl. No. 62/092,617, filed Dec. 16, 2014 by Agarwal et al.
Office Action Dated Feb. 18, 2016; U.S. Appl. No. 14/463,419; (74 pgs.).
Office Action Dated Feb. 23, 2016; U.S. Appl. No. 14/171,152; (61 pgs.).
"Understanding and Configuring the Undirectional Link Detection Protocol Feature"; Cisco support communication; Jul. 9, 2007; Document ID No. 10591; 5 pages; http://www.cisco.com/c/en/us/support/docs/lan-switching/spanning-tree-protocol/10591-77.html.
"DLDP Technology White Paper"; H3C products and solutions; 2008; 8 pages; http://www.h3c.com/portal/Products_Solutions/Technology/LAN/Technology_White_Paper/200812/623012_57_0.htm.
M. Foschiano; Cisco Systems UniDirectional Link Detection (UDLD) Protocol; Memo; Apr. 2008; 13 pages; Cisco Systems.
"Migration from Cisco UDLD to industry standard DLDP"; technical white paper; Feb. 2012; 12 pages; Hewlett-Packard Development Company.
Rooney et al: "Associative Ternary Cache for IP Routing", IEEE, pp. 409-416, 2004.
"Starburst: Building Next-Generation Internet Devices", Sharp et al., Bell Labs Technical Journal, Lucent Technologies, Inc., pp. 6-17, 2002.
NonFinal Office Action Dated Jun. 23, 2016; U.S. Appl. No. 14/530,193; (73 pgs.).
NonFinal Office Action Dated Jul. 13, 2016; U.S. Appl. No. 14/876,639; (69 pgs.).
Final Office Action Dated Jun. 3, 2016; U.S. Appl. No. 14/106,302; (35 pgs.).
Notice of Allowance Dated Jan. 6, 2017; U.S. Appl. No. 14/530,193; (18 pgs.).
Notice of Allowance Dated Feb. 8, 2017; U.S. Appl. No. 14/876,639; (25 pgs.).
Final Office Action Dated Jan. 26, 2017; U.S. Appl. No. 14/463,419; (57 pgs.).
Notice of Allowance Dated Oct. 13, 2016; U.S. Appl. No. 14/106,302; (23 pgs.).
Final Office Action Dated Aug. 24, 2016; U.S. Appl. No. 14/171,152; (39 pgs.).
NonFinal Office Action Dated Nov. 9, 2016; U.S. Appl. No. 14/506,943; (18 pgs.).

* cited by examiner

FRAMEWORK FOR RELIABLY COMMUNICATING PORT INFORMATION IN A SYSTEM OF DEVICES

CROSS REFERENCES TO RELATED APPLICATIONS

The present application claims the benefit and priority under 35 U.S.C. 119(e) of U.S. Provisional Application No. 61/974,924, filed Apr. 3, 2014, entitled "A RESILIENT DESIGN FOR RECOVERING FROM COMMUNICATION PORT SENDING/RECEIVING PROBLEMS IN A STACKING SYSTEM." The entire contents of this provisional application are incorporated herein by reference for all purposes.

BACKGROUND

As known in the art, a "stackable switch" is a network switch that can operate independently as a standalone device or in concert with one or more other stackable switches in a "stack" or "stacking system." FIG. 1A illustrates the front face of an exemplary stackable switch 100. As shown, the front face includes a set of data ports 102 (denoted by the letter "D"), a set of stacking ports 104 (denoted by the letter "S"), and an out-of-band management port 106 (denoted by the letter "M"). Data ports 102 are operable for connecting stackable switch 100 to one or more hosts and/or data networks. Stacking ports 104 are operable for linking stackable switch 100 to other stackable switches in the same stacking system/topology. Stacking ports 104 can be dedicated ports (i.e., ports designed specifically for stacking) or high bandwidth data uplink ports that operate in a stacking mode. Out-of-band management port 106 is operable for connecting stackable switch 100 to a separate terminal device, such as a laptop or desktop computer. Once connected, an administrator can use the terminal device to access the management console of stackable switch 100 and perform various switch management functions.

FIG. 1B illustrates an exemplary stacking system 150 comprising stackable switches 100(1), 100(2), and 100(3), each of which is substantially similar to stackable switch 100 of FIG. 1A. As shown, stackable switches 100(1)-100(3) are linked together via their respective stacking ports, thereby establishing a data path between the switches for forwarding network traffic. With this stack configuration, switches 100(1)-100(3) can behave as a single, logical switch having the combined data port capacity of the individual switches.

In a system of interconnected devices like stacking system 150, port failures can occasionally occur that affect the ability of system members to communicate with each other. For instance, in FIG. 1B, a failure may occur with respect to stacking port 152 of stackable switch 100(1) that prevents port 152 from sending data packets to and/or receiving data packets from port 154 of stackable switch 100(2). Generally speaking, if this failure causes stacking port 152 to transition from an "UP" status to a "DOWN" status, stackable switch 100(1) can detect that the port is down and can re-route traffic for the port on an alternative link/path to stackable switch 100(2) (e.g., through stackable switch 100(3)).

However, in some failure scenarios, a port may fail in a manner that does not cause its status to change. For example, ports that support speeds of 10 Gigabits per second (Gbps) or higher typically have sophisticated electronic and/or optical components and firmware logic. Further, such ports are internally connected to a packet processor that handles queuing, makes wire-speed forwarding decisions, and so on. A failure that arises due to a component/firmware problem or due to an issue with a connected packet processor may prevent the affected port from sending or receiving packets, but may nevertheless cause the port remain in an UP status. This, in turn, can prevent the switch that owns the port from detecting the failure, potentially leading to packet misforwarding, packet black holes, and other conditions that can result in a partial or complete network breakdown.

There are certain existing protocols, such as Unidirectional Link Detection Protocol (UDLD), that can mitigate the issue above by determining when a bidirectional link has become unidirectional or nonfunctional and marking the end ports of the link as being logically down. However, these existing protocols generally operate with respect to a single link at a time. For example, in stacking system 150 of FIG. 1B, a separate instance of UDLD would need to be run on each stacking link interconnecting stackable switches 100(1)-100(3), and each protocol instance would only be able to communicate, between the two end switches of the link, information regarding the link's end ports. This means that UDLD and other similar protocols do not have a holistic view of the port statuses of all of the devices in a system, which limits their ability to detect different types of port/link problems. For instance, UDLD cannot distinguish between (1) a scenario where a bidirectional link has become unidirectional (due to, e.g., a failure of a single end port) and (2) a scenario where the same bidirectional link has become completely nonfunctional (due to, e.g., failures of both end ports or a cable failure). Further, UDLD cannot detect a problem where one end port of a link remains up while the other end port of the link has gone down (referred to as the "one-end-up, one-end-down" problem).

SUMMARY

A framework for reliably communicating port information in a system of devices is provided. In one embodiment, each device in the system of devices can create a first record that includes port information pertaining to a plurality of ports of the device, where the plurality of ports are usable for communicatively coupling the device to other devices in the system of devices. The device can further receive, from the other devices in the system of devices, one or more second records including port information pertaining to the ports of the other devices, and can store the first record and the one or more second records in a data store maintained locally on the device. The device can then forward copies of the first record and the one or more second records out of each of the plurality of ports, thereby causing the copies of the first record and the one or more second records to be communicated to the other devices in the system of devices.

The following detailed description and accompanying drawings provide a better understanding of the nature and advantages of particular embodiments.

DETAILED DESCRIPTION

Figure 1A:
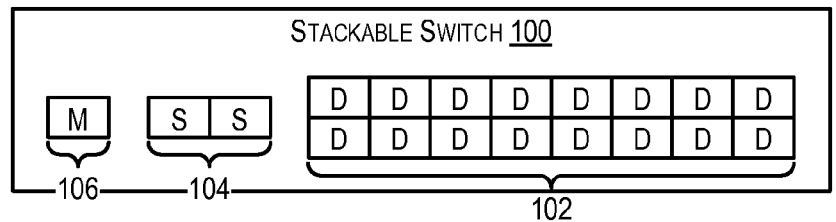
FIG. 1A depicts an exemplary stackable switch.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes a framework for reliably communicating port information in a system of devices, such as a stacking system comprising stackable switches. In one set of embodiments, each device in the system of devices can create a device record that includes port information regarding the ports of the device that are useable for connecting the device to other devices in the system. This port information can comprise, e.g., physical connection information (e.g., which neighbor port each port is connected to), port status information (e.g., whether each port is UP or DOWN), and more. The device can store the created device record in a data store (e.g., database) that is locally maintained on the device. The device can further forward the created device record out each of its ports to the other devices in the system of devices.

Upon receiving a device record from another device in the system of devices, each device can add the received device record to its local data store (if the latest version of that record does not already exist). In this manner, the device can keep copies of the device records of other system members, in addition to its own device record, in the local data store. Each device can also update its own device record in response to events that affect the port information included therein (e.g., port status changes, the addition or removal of ports, the receipt of a device record with neighbor port information, etc.).

Finally, each device in the system of devices can periodically aggregate and forward the device records in its local data store out of each of its ports, thereby communicating the latest versions of those device records and their included port information to the other devices in the system of devices.

With the framework described above, each device in the system of devices can have a complete and accurate view of the port connections and port statuses of the entire system. For instance, if there are M devices in the system of devices, each device will maintain (once the exchange of device records reaches a stable state) M device records in its local data store, each record comprising the latest port information for a different device in the system. Among other things, this system-wide port information can enable each device to more intelligently and more precisely detect port/link problems. For example, in certain embodiments, each device can analyze the device records in its local data store to detect and distinguish between: (1) a problem that causes a link to become unidirectional; (2) a problem that causes a link to become nonfunctional; and (3) a problem that causes one end port of a link to remain up while the other end port goes down. Depending on the nature of the detected problem, the system may report the problem to an administrator, or may take steps to automatically resolve the problem (by, e.g., disabling the failed ports or reloading the devices with the failed ports).

Further, since each device in the system forwards device records using every possible device-to-device port, the foregoing framework provides a more reliable and resilient communication mechanism than conventional Layer 2 unicast, multicast, or broadcast. Generally speaking, as long as there is at least one available path between any two devices in the system, each device will be able to exchange device records with every other device. This resiliency is particularly beneficial when attempting to detect port/link problems as noted above, because those port/link problems (assuming they do not break the system into partitions) will not prevent the devices from exchanging the port information needed to carry out the detection process.

In some embodiments, in addition to including port information, each device record can also include a general-purpose message field. As described in further detail below, the devices in the system can leverage this general-purpose message field to reliably communicate different types of information beyond port information (e.g., device actions, etc.) to each other. The devices can then analyze and/or act on this information for various purposes (e.g., logging, coordinating device reloads, etc.).

For clarity of explanation, in the sections that follow, several examples and embodiments are described in the context of stacking systems. However, it should be appreciated that the techniques described herein can apply to other types of networked systems where the reliable exchange of port information may be a desirable or useful feature. Accordingly, within the detailed description, references to "stacks" or "stacking systems" can be construed as encompassing generalized systems of devices, and references to "switches" or "stackable switches" can be construed as encompassing generalized devices within a system.

2. System Environment

Figure 2:
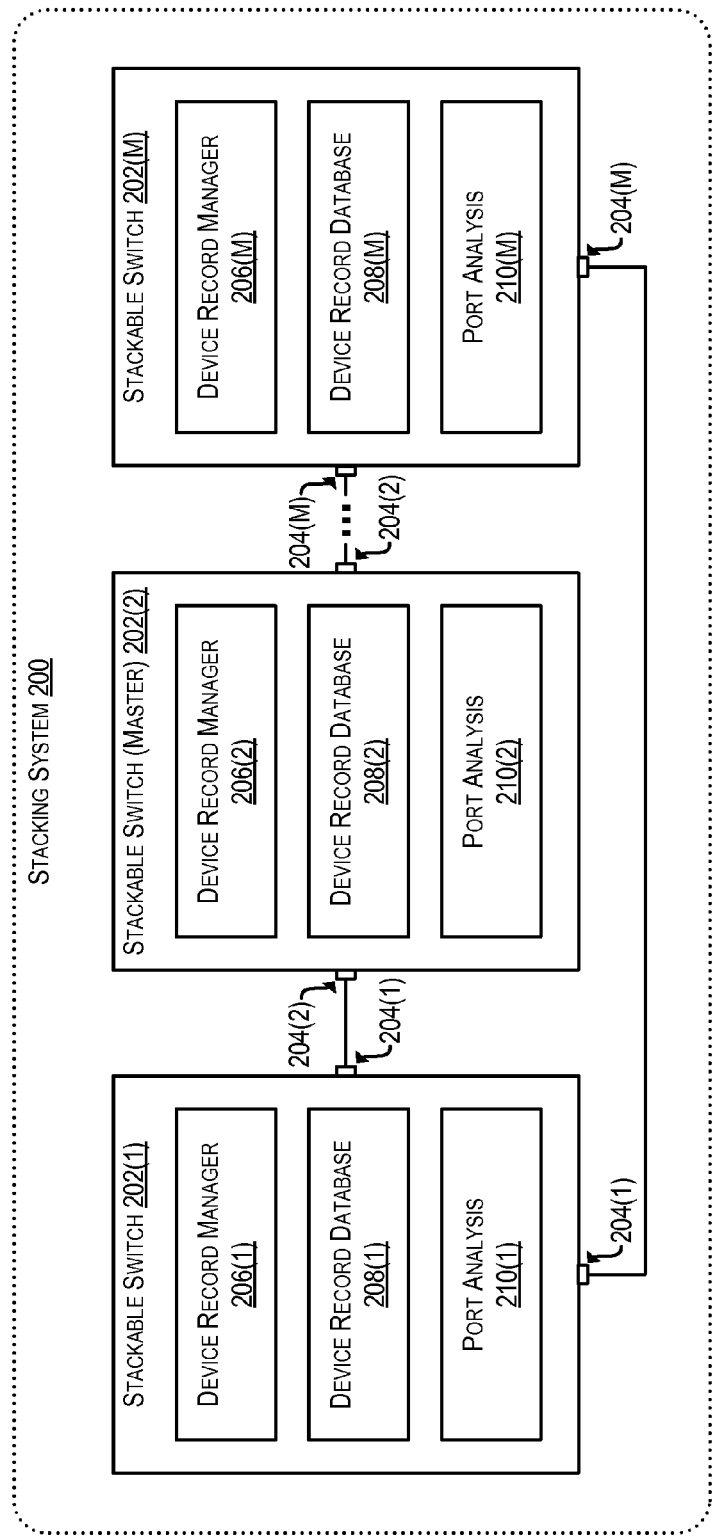
FIG. 2 depicts a stacking system that supports a framework for reliably communicating port information according to an embodiment.

FIG. 2 depicts a stacking system 200 that supports a framework for reliably communicating port information according to an embodiment. As shown, stacking system 200 comprises a number of stackable switches 202(1)-202(M) that are interconnected via their respective stacking ports 204(1)-204(M). Although stackable switches 202(1)-202(M) are depicted as forming a ring topology, it should be appreciated that other types of topologies (e.g., linear, star, arbitrary mesh, etc.) are possible.

In the example of FIG. 2, stackable switch 202(2) is designated as the master switch of stacking system 200, which means that switch 202(2) serves as the point of user contact for all management functions of system 200. For instance, master switch 202(2) can accept and process user commands directed to the overall configuration of stacking system 200. Master switch 202(2) can also communicate with the non-master switches of stacking system 200 as needed in order to propagate various types of management commands and data to those switches.

As noted in the Background section, one challenge with managing a system of devices such as stacking system 200 is that the ports interconnecting the constituent switches (i.e., stacking ports 204(1)-204(M)) can occasionally fail to send or receive packets, but can remain in an UP status. In these scenarios, the stackable switches that own the problematic ports cannot easily detect the failures because the ports appear to be operational according to their statuses, potentially leading to various conditions that can cause a network breakdown.

To address the foregoing and other similar issues, each stackable switch 202(1)-202(M) of stacking system 200 can include a novel device record manager 206(1)-206(M), a novel device record database 208(1)-208(M), and a novel port analysis component 210(1)-210(M). In one set of embodiments, these components can be implemented as software that is executed by, e.g., a management processor of each respective switch and stored in an associated memory (not shown). In other embodiments, one or more of these components can be implemented partially or entirely in hardware.

At a high level, each device record manager 206(1)-206(M) can execute flows for creating, updating, and propagating device records through stacking system 200. These device records, which are maintained in device record databases 208(1)-208(M), can include port information pertaining to the stacking ports of each individual switch 202(1)-202(M), such as stacking port connection information, stacking port status information, etc. The device records can also include other types of information that stackable switches 202(1)-202(M) may wish to communicate to each other, such as device actions and so on. The end result of these flows is that each stackable switch 202(1)-202(M) will have, in the form of the aggregated device records stored in device record databases 208(1)-208(M), a complete view of the stacking port connections and stacking port statuses throughout stacking system 200. Stackable switches 202(1)-202(M) can then leverage this system-wide port information in various ways. For example, in one set of embodiments, each port analysis component 210(1)-210(M) can analyze the devices records in its corresponding device record database 208(1)-208(M) to intelligently detect different types of stacking port/link problems. In further embodiments, each port analysis component 210(1)-210(M) can take steps to resolve certain types of stacking port/link problems, without human intervention.

Notably, as part of the device record propagation described above, device record managers 206(1)-206(M) can make use of every possible stacking link interconnecting stackable switches 202(1)-202(M) for communicating device records. For instance, in FIG. 2, device record manager 206(1) of stackable switch 202(1) can forward device records out of each of the switch's two stacking ports 204(1), device record manager 206(2) of stackable switch 202(2) can forward device records out of each of the switch's two stacking ports 204(2), and device record manager 206(M) of stackable switch 202(M) can forward device records out of each of the switch's two stacking ports 204(M). If any of stacking ports 204(1)-204(M) is a trunk port, device managers 206(1)-206(M) can forward device records out of each sub-port of the trunk port. In this way, device record managers 206(1)-206(M) can increase the likelihood that the transmitted device records will reach every other stack member, which is particularly useful in problematic systems where stacking port/link failures can shut down one or more stacking links.

The detailed operation of device record managers 206(1)-206(M) and port analysis components 210(1)-210(M) is presented in the sections that follow.

3. Creating, Updating, and Propagating Device Records

Figure 3:
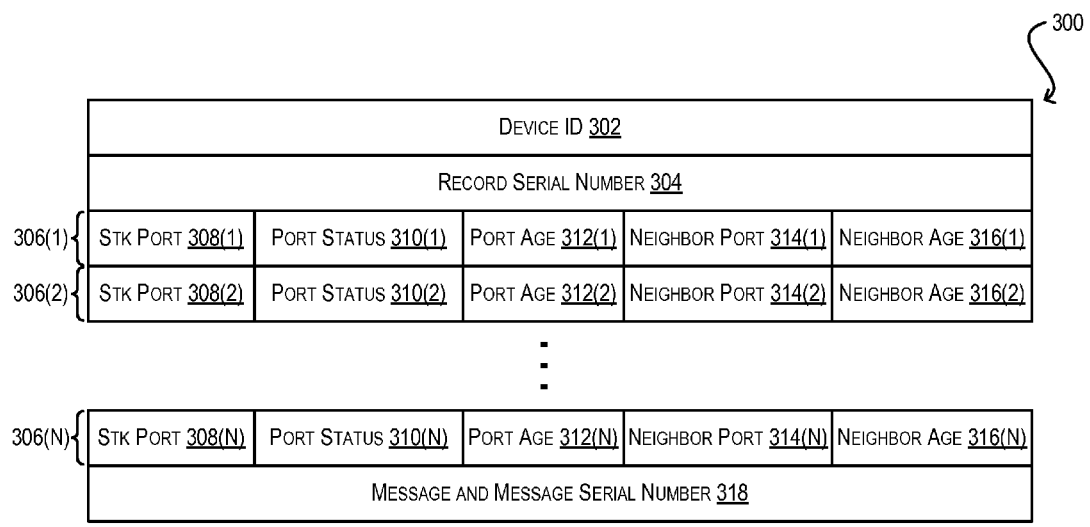
FIG. 3 depicts the structure of a device record according to an embodiment.

As discussed above, in various embodiments, the mechanism by which device record managers 206(1)-206(M) can communicate port information among stackable switches 202(1)-202(M) of stacking system 200 is via the exchange of device records. FIG. 3 depicts the structure of an example device record 300 according to an embodiment. As shown, device record 300 includes a device ID 302, a record serial number 304, a number of connection entries 306(1)-306(N) (each comprising a stacking port 308(1)-308(N), a port status 310(1)-310(N), a port age 312(1)-312(N), a neighbor port 314(1)-314(N), and a neighbor age 316(1)-316(N)), and a message and message serial number 318. Each of these fields is described in turn below.

Device ID 302—Identifies the stackable switch to which device record 300 pertains.

Record serial number 304—Identifies the version of device record 300. In one embodiment, this field can only be updated by the device record manager of the switch identified by device ID 302.

Connection entries 306(1)-306(N)—Contains information pertaining to each stacking port N of the switch identified by device ID 302 (one entry per stacking port). Each connection entry includes:

Stacking port 308(1)-308(N)—Identifies the stacking port to which the current connection entry pertains. In one embodiment, this field can be populated with a device ID/port ID pair (e.g., 2/10, which identifies stacking port 10 of switch 2). In other embodiments, this field can be populated with additional information that may be relevant for the stacking port (e.g., associated trunk ID, speed, etc.).

Port status 310(1)-310(N)—Identifies the current status of stacking port 308(1)-308(N). In one embodiment, can be populated with an "UP" status (indicating that the stacking port is up/operational) or a "DOWN" status (indicating that the stacking port is down/nonoperational).

Port age 312(1)-312(N)—Identifies the amount of time (in, e.g., seconds) since port status 310(1)-310(N) last changed.

Neighbor port 314(1)-314(N)—Identifies the neighbor port (if any) to which stacking port 308(1)-308(N) is currently (or was previously) connected.

Neighbor age 316(1)-316(N)—If port status 310(1)-310(N) is UP, identifies the amount of time (in, e.g., seconds) since stacking port 308(1)-308(N) has received a probe packet (described below) from corresponding neighbor port 314(1)-314(N).

Message and message serial number 318—General purpose fields for communicating additional information to other stackable switches. The message serial number identifies the version of the message. As discussed in Section (5) below, these fields can be leveraged to communicate device actions among switches for, e.g., activity logging or coordinating device reloads in the case of a port/link recovery routine.

Figure 4:
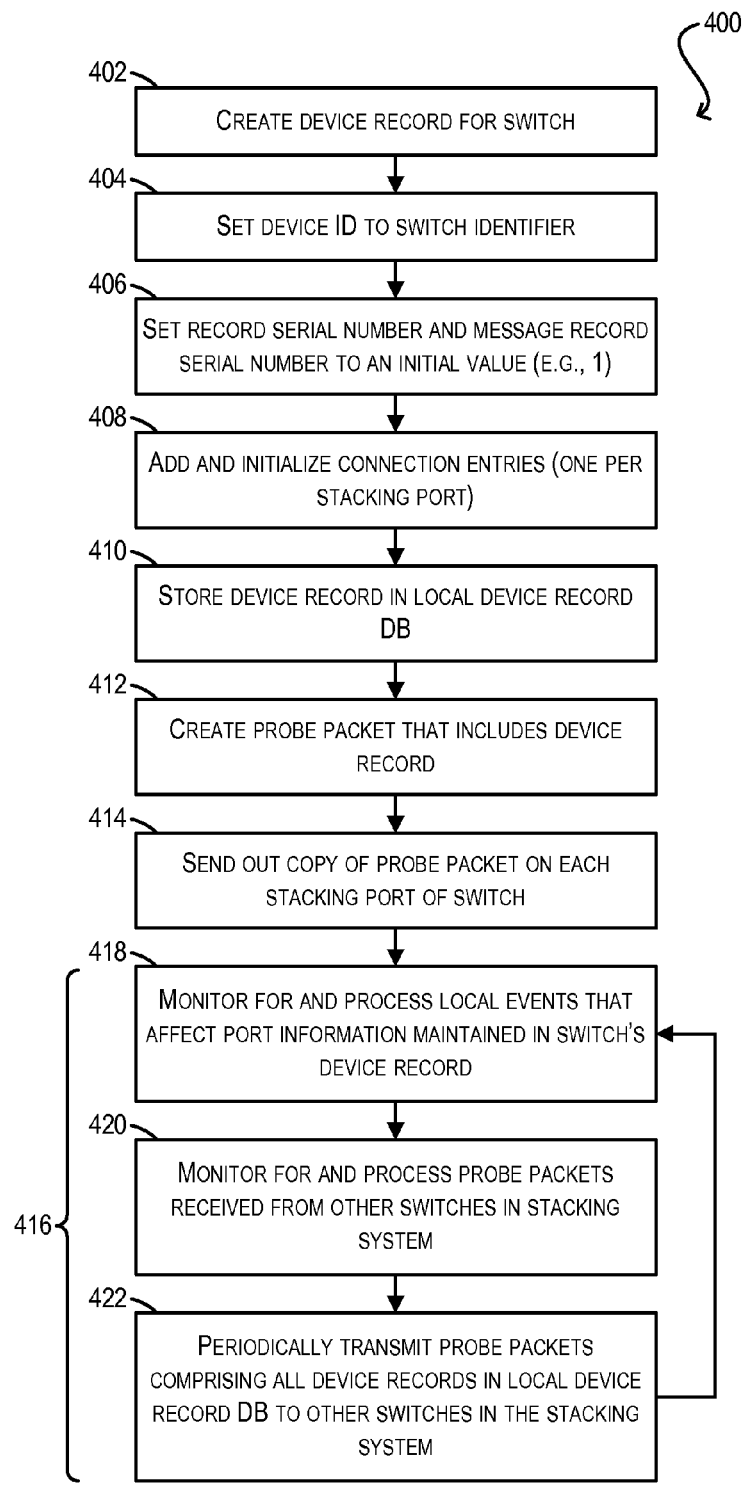
FIG. 4 depicts a flowchart for creating and propagating device records according to an embodiment.

With the structure of device record 300 in mind, FIG. 4 depicts a flowchart 400 that can be performed by each device record manager 206(X) of FIG. 2 in order to create, update, and propagate device records within stacking system 200 according to an embodiment. By carrying out flowchart 400, the device record managers can achieve reliable communication of port information among stackable switches 202(1)-202(M).

Starting with block 402, each device record manager 206(X) can create a device record for its host stackable switch 202(X). As part of this record creation process, device record manager 206(X) can set the device ID of the device record to an identifier of switch 202(X) (block 404), and can set the record and message record serial numbers to an initial value (e.g., 1) (block 406). Device record manager 206(X) can also add connection entries to the device record (one per stacking port of switch 202(X)) and can initialize the fields of each connection entry (block 408).

Figure 5:
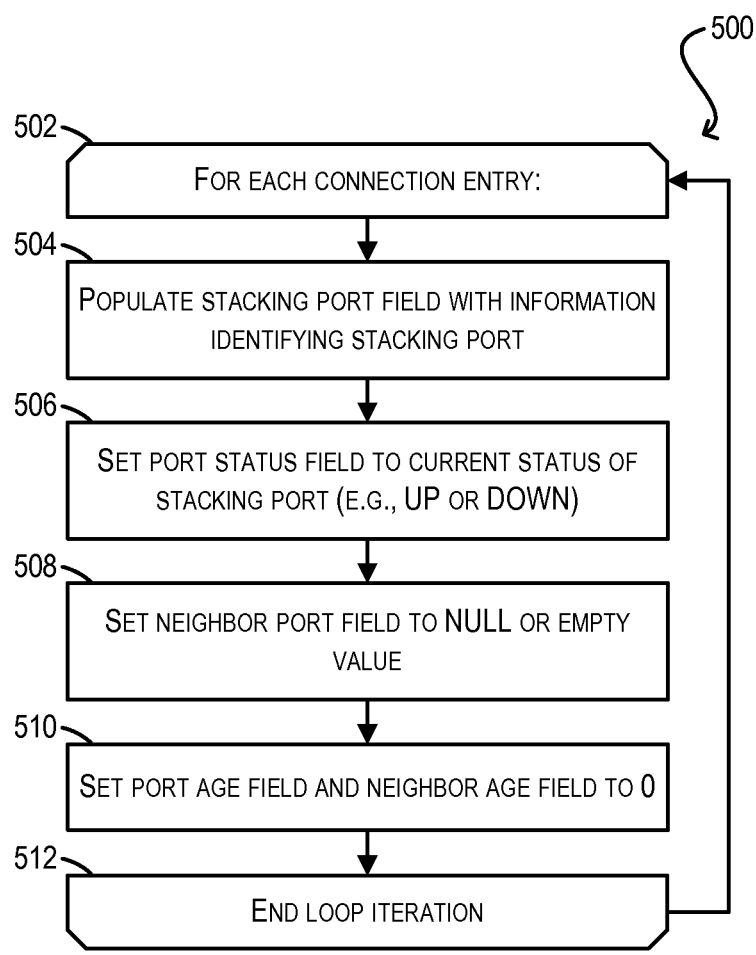
FIG. 5 depicts a flowchart for initializing connection entries of a device record according to an embodiment.

FIG. 5 depicts a flowchart 500 for initializing connection entries per block 408 of FIG. 4 according to an embodiment. At block 502 of FIG. 5, device record manager 206(X) can enter a loop for each newly added connection entry. Within the loop, device record manager 206(X) can populate the stacking port field of the current connection entry with information identifying a particular stacking port (e.g., port X/10) (block 504). Device record manager 206(X) can also set the port status field to the current status of the stacking port (e.g., UP or DOWN) (block 506).

At block 508, device record manager 206(X) can set the neighbor port field of the current connection entry to a NULL or empty value (since the identity of the neighbor port is not yet known).

Finally, at block 510, device record manager 206(X) can set the port age and neighbor age fields to 0, thereby completing the initialization of the current connection entry. The current loop iteration can then end (block 512), and device record manager 206(X) can repeat blocks 504-510 as needed in order to initialize additional connection entries.

Referring back to FIG. 4, once all of the connection entries for the device record have been added and initialized, device record manager 206(X) can store the device record in its local device record database 208(X) (block 410). In addition, device record manager 206(X) can create a "probe packet" that includes the device record (block 412), and can send out a copy the probe packet on each stacking port of stackable switch 202(X) (block 414). In this manner, device record manager 206(X) can communicate the newly created device record to every other switch in the system. As discussed in further detail below, in a particular embodiment each forwarded probe packet can include an indication of the egress stacking port from which it originated, which can be used by receiving switches to populate the neighbor port fields in their own device records.

After the probe packet transmission at block 414, device record manager 206(X) can enter a loop (denoted by reference numeral 416) in which it can continuously (1) update the device record created at block 402, (2) learn/ingest device records received from other stackable switches in stacking system 200, and (3) forward the latest versions of the device records in local device record database 208(X) out of its stacking ports to the other stackable switches. For instance, at block 418, device record manager 206(X) can monitor for local events that affect the port information maintained in switch 202(X)'s device record. To the extent that a particular event requires a modification to one or more fields of the device record, device record manager 206(X) can process the event and can update the device record accordingly.

Figure 6:
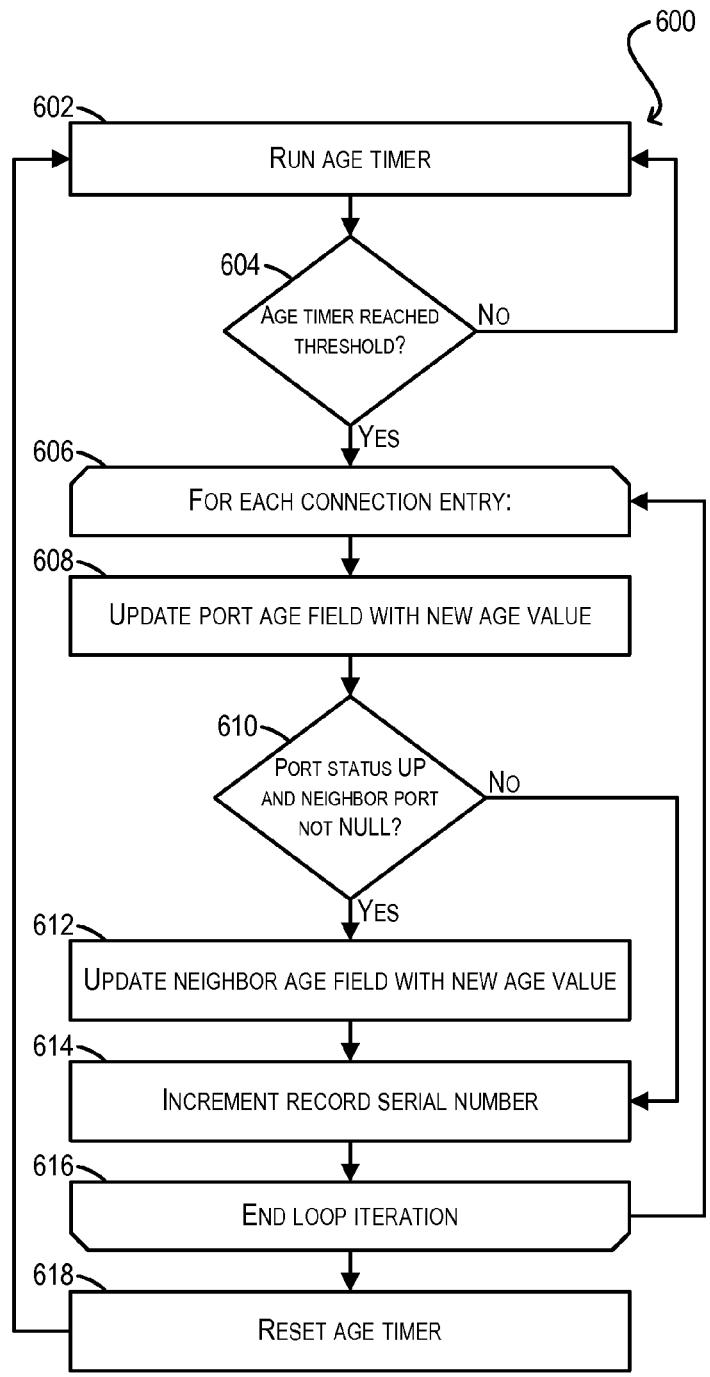
FIG. 6 depicts a flowchart for periodically updating the port age and neighbor age fields of a device record according to an embodiment.

By way of example, FIG. 6 depicts a flowchart 600 that can be performed as part of block 418 of FIG. 4 for detecting the expiration of an age timer and updating the port age and/or neighbor age fields of switch 202(X)'s device record according to an embodiment. At block 602 of FIG. 6, device record manager 206(X) can run an age timer associated with the port age and neighbor age fields. At block 604, device record manager 206(X) can check whether the age timer has reached a predefined threshold (i.e., has expired). If it has not, device record manager 206(X) can return to block 602.

If the age time has reached the predefined threshold at block 604, device record manager 206(X) can enter a loop for each connection entry of switch 202(X)'s device record (block 606). Within the loop, device record manager 206(X) can first update the port age field of the connection entry with a new age value that reflects the amount of time since the last port status change for the entry's stacking port (block 608).

Device record manager 206(X) can then check whether the port status field of the connection entry is UP and the neighbor port field is not NULL (indicating that the stacking port is currently connected to a known neighbor) (block 610). If not, device record manager 206(X) can increment the record serial number for the device record and the current loop iteration can end (block 616).

On the other hand, if the port status is determined to be UP and the neighbor port field is determined to be not NULL at block 610, device record manager 206(X) can update the neighbor age field with a new age value that reflects the amount of time since a probe packet was last received on the stacking port from the neighbor port (block 612). Device record manager 206(X) can then proceed to increment the record serial number as mentioned above (block 614) and the current loop iteration can end (block 616).

Blocks 608-614 can be repeated as many times as needed to process all of the connection entries in switch 202(X)'s device record. Finally, at block 618, device record manager 618 can reset the age timer and return to block 602 to begin the next round of age field updates.

Figure 7:
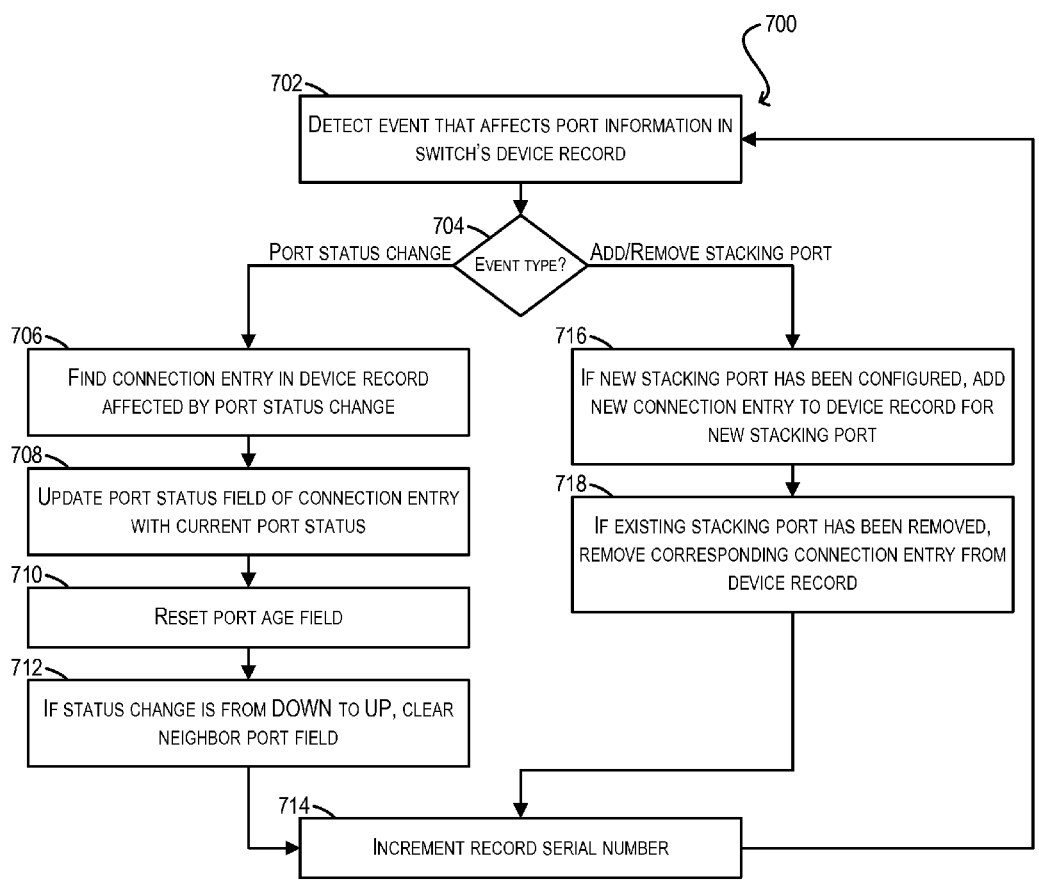
FIG. 7 depicts a flowchart for updating other fields of a device record according to an embodiment.

In addition to monitoring the age timer and updating the port age and/or neighbor age fields of switch 202(X)'s device record per flowchart 600 of FIG. 6, device record manager 206(X) can, as part of block 418 of FIG. 4, also monitor for and process other events that affect other fields of the device record. FIG. 7 depicts a flowchart 700 of such a process. In various embodiments, flowchart 700 can be performed concurrently with flowchart 600 of FIG. 6.

At block 702 of FIG. 7, device record manager 206(X) can detect an event (other than the age timer expiration described with respect to FIG. 6) that affects the port information in switch 202(X)'s device record. At block 704, device record manager 206(X) can determine the event type. If the event is a port status change, device record manager 206(X) can find the connection entry in the device record corresponding to the affected stacking port (block 706), update the port status field of the connection entry with the current port status (block 708), and reset the port age field to 0 (block 710). Additionally, if the detected port status change is a change from DOWN to UP, device record manager 206(X) can clear the neighbor port field (block 712). Device record manager 206(X) can then increment the record serial number (block 714) and return to block 702 to detect additional events.

If the event detected at block 702 corresponds to the addition or removal of a stacking port from switch 202(X)'s configuration, device record manager 206(X) can either add a new connection entry to the device record (for the newly added stacking port) or remove an existing connection entry (for the deleted stacking port) as appropriate (blocks 716 and 718). Device record manager 206(X) can then increment the record serial number as mentioned above (block 714) and traverse back to block 702 to detect additional events.

Returning now to FIG. 4, the second step in loop 416 comprises monitoring for and processing probe packets received from other stackable switches in stacking system 200 (block 420)). By processing such probe packets, device record manager 206(X) can learn the device records of other switches in the system.

Figure 8:
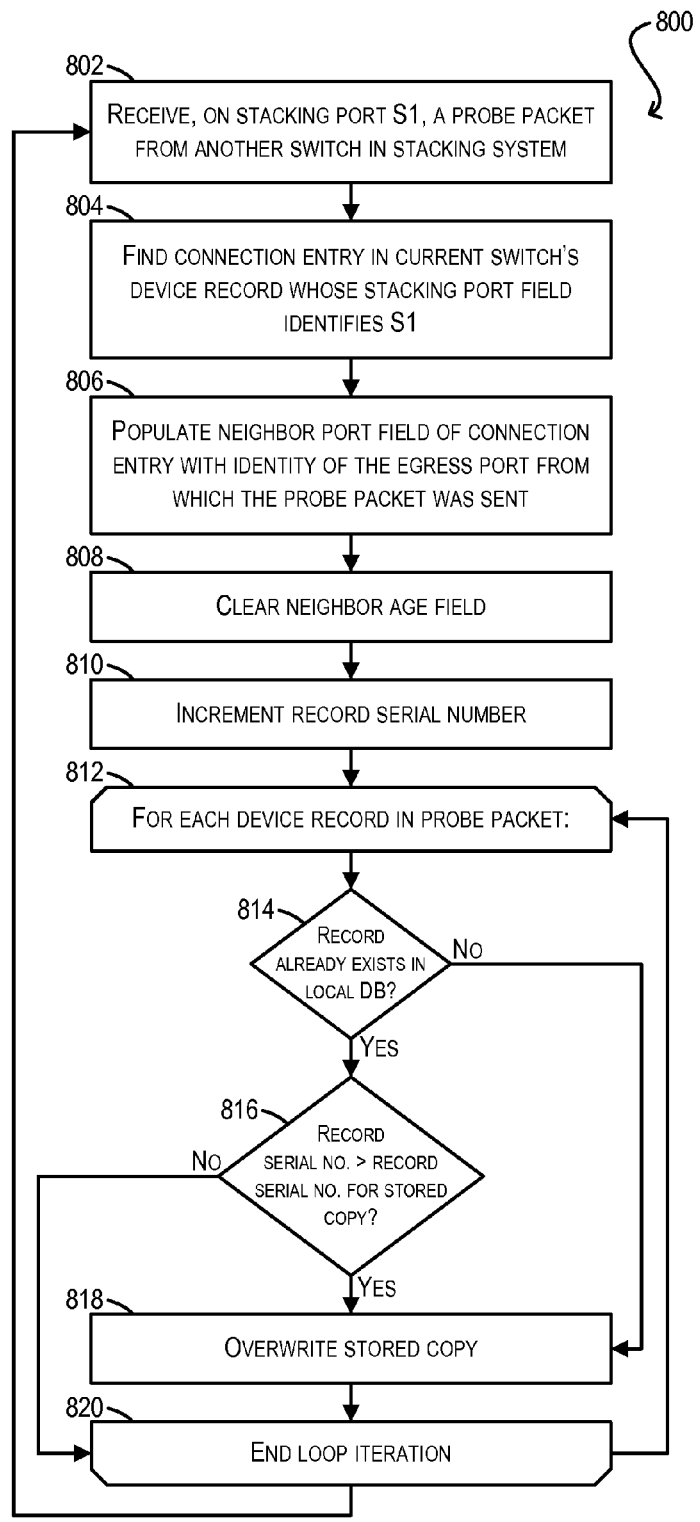
FIG. 8 depicts a flowchart for processing device records received from other devices according to an embodiment.

FIG. 8 depicts a flowchart 800 that can be performed by device record manager 206(X) for processing received probe packets per block 420 of FIG. 4 according to an embodiment. Starting with block 802, device record manager 206(X) can receive, on a stacking port S1 of switch 202(X), a probe packet from another stackable switch in stacking system 200.

In response, device record manager 206(X) can find a connection entry in switch 202(X)'s device record whose stacking port field identifies S1 (block 804).

At block 806, device record manager 206(X) can populate the neighbor port field of the connection entry found at block 804 with the identity of the egress port from which the probe packet originated. As discussed previously, this egress port information may be included in the probe packet as a separate packet field. Device record manager 206(X) can also clear the neighbor age field of the connection entry and increment the record serial number (blocks 808 and 810).

Then, device record manager 206(X) can extract all of the device records included in the probe packet and enter a loop 812 for each device record. Within the loop, device record manager 206(X) can first check whether a device record for the switch to which the record pertains already exists in local device record database 208(X). If not, device record manager 206(X) can store a copy of the device record in database 208(X) and move on to the next device record (blocks 818 and 820).

Otherwise, device record manager 206(X) can compare the record serial number of the device record from the received probe packet with the record serial number of the existing device record in local device record database 208(X) (block 816). If the record serial number of the device record from the received probe packet is greater, device record manager 206(X) can conclude that this device record is more up-to-date than the existing device record and thus can overwrite the existing device record with the received version in database 208(X) (block 818).

On the other hand, if the record serial number of the existing device record in local device record database 208(X) is greater, device record manager 206(X) can determine that the received device record is out-of-date, and thus can proceed directly to the end of the loop iteration (block 820) without modifying the existing device record. In either case, once the loop end has been reached, device record manager 206(X) can traverse back to block 812 and repeat blocks 814-818 until all of the device records in the probe packet have been processed.

Returning now to FIG. 4, as the final step in loop 416 (and flowchart 400), device record manager 206(X) can periodically transmit probe packets comprising the aggregated device records stored in local device record database 208(X) out of all of the stacking ports of switch 202(X). For instance, device record manager 206(X) can perform this transmission once every second, every 5 seconds, etc. In this manner, device record manager 206(X) can communicate the latest versions of all of the device records that it is aware of (i.e., the device record of switch 202(X), as well as the device records of other switches in stacking system 200 that have been learned per block 420) to every other switch. Eventually, once loop 416 has run long enough, every stackable switch 202(1)-202(M) in stacking system 200 will have the same set of device records in its local device record database 208(1)-208(M) (one device record per switch), where the set of device records reflects the current port connection and status information for the entirety of system 200.

Generally speaking, the time to reach this stable condition will depend on the maximum hop count in system 200's topology and packet loss rate. However, it should be noted that it is not necessary for stacking system 200 to reach a stable condition before the device records stored in local device record databases 208(1)-208(M) can provide useful information to their respective switches. For example, in an extreme case, system 200 may never reach a stable condition if, e.g., the status of a particular stacking port flaps up and down every second. Even in this scenario, the device records/connection entries stored in each device record database 208(1)-208(M) will provide correct port connection information, and thus the individual switches can identify, with some analysis, which port is experiencing issues.

Further, it should be noted that, as part of block 422 of FIG. 4, device record manager 206(X) can use every available stacking port of stackable switch 202(X) for sending out probe packets. As mentioned previously, unlike conventional L2 unicast/multicast/broadcast, this ensures that every possible stacking path of system 200 is used, thereby increasing the likelihood that the probe packets will reach the other switches in the face of one or more port/link failures.

Although not shown in FIGS. 4-8, in certain embodiments, when device record manager 206(X) detects a major change to any device record in its local device record database 208(X), device record manager 206(X) can setup a short timer (e.g., 100 milliseconds) to send out a probe packet containing all device records on all stacking ports. In these embodiments, a "major change" refers to a change to any device record field except port age, neighbor age, and record serial number. In a particular embodiment, this transmission is in addition to the periodic transmissions described at block 422 of flowchart 400. With this enhancement, major device record changes can be more quickly propagated throughout the system. One of ordinary skill in the art may recognize other variations, modifications, and alternatives for the processing of FIGS. 4-8.

4. Detecting Port/Link Problems

As mentioned previously, once flowchart 400 has run long enough, each stackable switch 202(1)-202(M) will have, in the form of the aggregated device records stored in device record databases 208(1)-208(M), a complete view of the stacking port connections and stacking port statuses throughout stacking system 200. Stackable switches 202(1)-202(M) can then leverage this system-wide port information in various ways. For example, in one set of embodiments, port analysis components 210(1)-210(M) of stackable switches 202(1)-202(M) can use these device records to automatically detect port/link problems within stacking system 200. As used herein, the term "port/link problem" refers to a situation where one or more stacking ports of a stacking link are in an UP status, but cannot send and/or receive packets. Because the statuses of these problematic ports are UP, their host switches will (without the detection techniques described below) continue to use the problematic ports in the system's forwarding path, potentially leading to packet mis-forwarding, packet black holes, and other similar conditions.

Figure 9A:
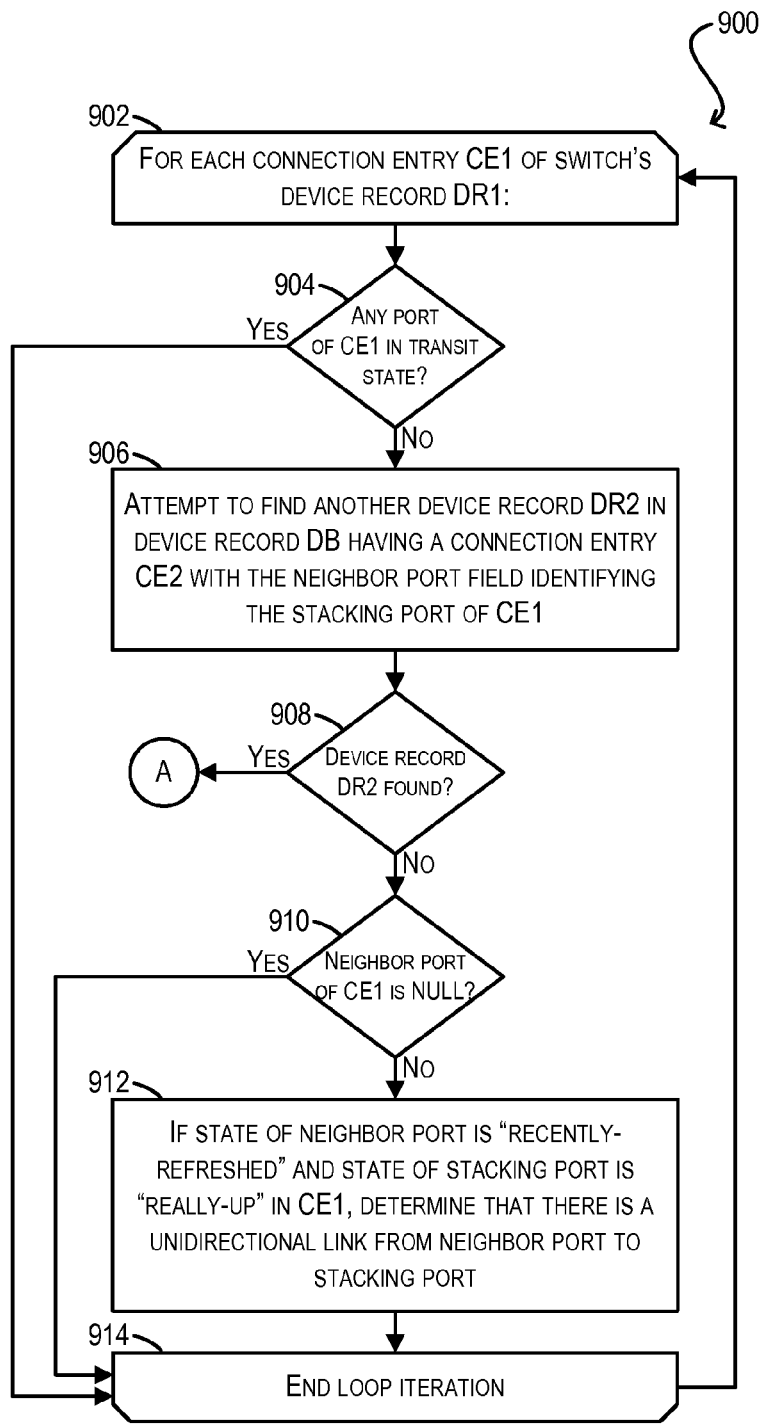
FIGS. 9A and 9B depict a flowchart for detecting port/link problems according to an embodiment.
Figure 9B:
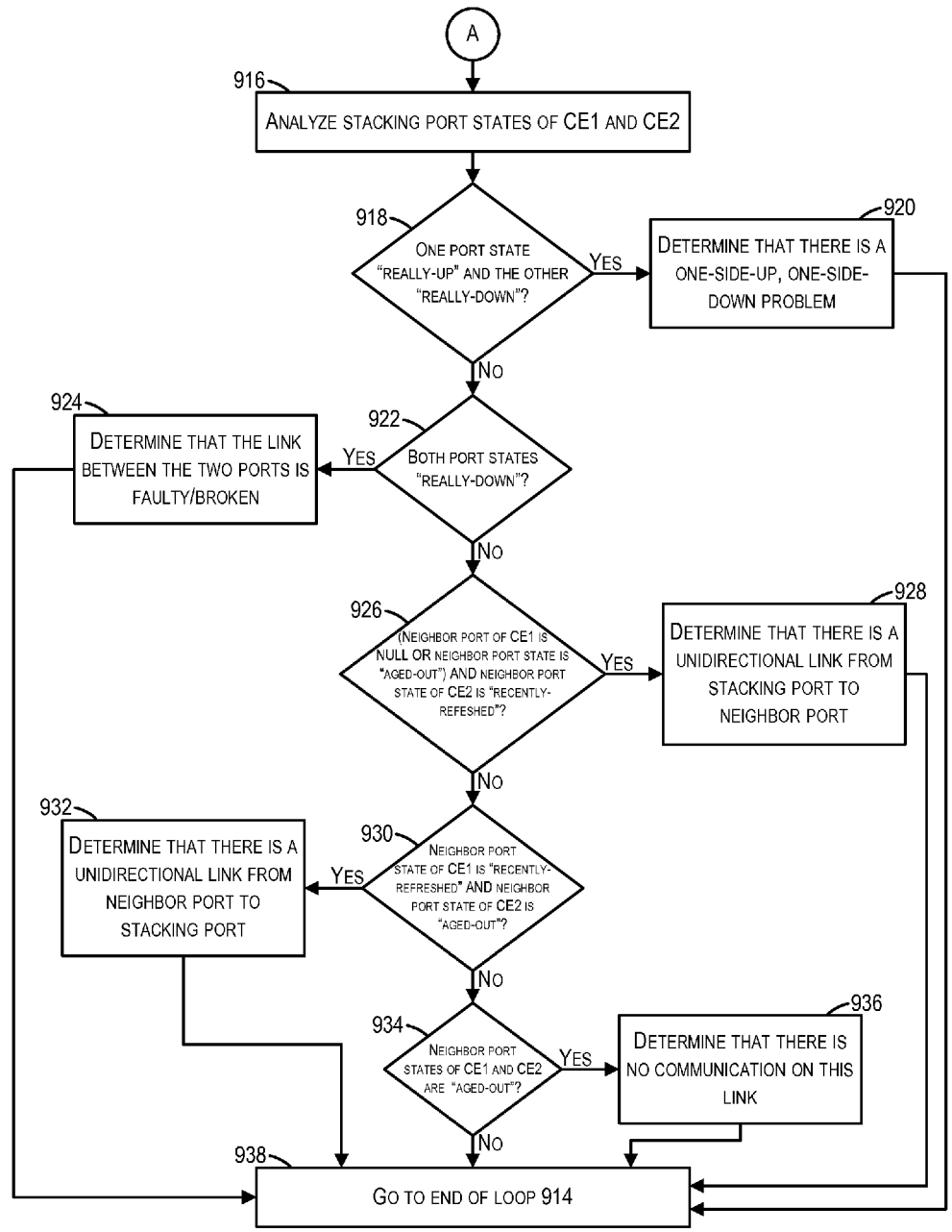

FIGS. 9A and 9B depict a flowchart 900 that can be performed by each port analysis component 210(X) of FIG. 2 for detecting port/link problems according to an embodiment. Flowchart 900 can enable port analysis component 210(X) to detect and distinguish between the following port/link problems:
1. A stacking port completely loses communication with its neighbor port
2. A stacking link (which is normally bidirectional) becomes unidirectional (e.g., only one end port of the link can send packets)
3. One end port of a stacking link goes down while the other end port remains up Flowchart 900 assumes that flowchart 400 of FIG. 4 has been (or is concurrently being) executed. In addition, flowchart 900 relies on the notion of a "stacking port state" and a "neighbor port state" for each connection entry of a device record. These states are defined as follows:

The stacking port state of a connection entry is:
"transit-up" if the port status field is UP and if the port age field is less than a first threshold (e.g., 10 seconds)
"really-up" if the port status field is UP and port age field is greater than or equal to the first threshold
"transit-down" if the port status field is DOWN and if port age field is less than a second threshold (e.g., 5 seconds)
"really-down" if the port status field is DOWN and if port age field is greater than or equal to the second threshold The neighbor port state of a connection entry is:
"aged-out" if the neighbor age field is greater than a third threshold (e.g., 40 seconds)
"recently-refreshed" if the neighbor age field is less than a fourth threshold (e.g., 15 seconds)
"transit-aged-out" if the neighbor age field is between the third and fourth thresholds The stacking port and neighbor port states described above can be useful for avoiding "false positives" during the execution of flowchart 900 (i.e., detecting a port/link problem when no problem actually exists). In particular, when a port analysis component determines that a link is in a "transit" state (e.g., transit-up, transit-down, transit-aged-out), the component can skip any further problem detection processing for that link. Thus, this allows the port analysis component to account for scenarios where a given port may not have received any packets within a transit period (as defined by the first, second, third, and fourth thresholds above) due to issues other than a port failure (e.g., busy CPU, packet loss, etc.). Generally speaking, as the transit periods are increased, the likelihood of false positives will be reduced, but the time needed to detect port/link problems will be longer. The optimal lengths for the transit periods can be determined empirically on a per-deployment basis.

Starting with FIG. 9A, at block 902, port analysis component 210(X) of stackable switch 202(X) can enter a loop for each connection entry CE1 for switch 202(X)'s device record DR1. It is assumed that port analysis component 210(X) initiates this loop on a periodic basis (e.g., every second, every 10 seconds, etc).

At block 904, port analysis component 210(X) can check whether any port of CE1 is in a transit state (e.g., transit-up, transit-down, or transit-aged-out). This can comprise checking the stacking port, neighbor port, port status, port age, and neighbor age fields of CE1 and determining the states of the stacking port and the neighbor port in accordance with the definitions above. If either the stacking port or the neighbor port is in a transit state, port analysis component 210(X) can proceed directly to the end of the current loop iteration (block 914) and subsequently return to block 902 to process additional connection entries. As noted previously, this logic allows port analysis component 210(X) to avoid a false positive with respect to the connection entry due to, e.g., packet loss or a busy CPU.

On the other hand, if none of the ports of CE1 are in a transit state, port analysis component 210(X) can attempt to find another device record DR2 in local device record database 208(X) that has a connection entry CE2 with the neighbor port field identifying the stacking port of CE1. Device record DR2 corresponds to the stackable switch in system 200 that is directly connected to stackable switch 202(X) via the stacking port identified in CE1 (if such a neighbor exists).

If device record DR2 is found, flowchart 900 can proceed to FIG. 9B. At blocks 916 and 918 of FIG. 9B, port analysis component 210(X) can analyze the stacking port states of CE1 and CE2 and first check whether one stacking port state is "really-up" while the other stacking port state is "really-down." If so, port analysis component 910(X) can determine that there is a one-side-up, one-side-down problem (block 920) and can proceed to the end of the current loop iteration at block 914 (thereby ending the processing for CE1).

Otherwise, port analysis component 210(X) can move on to checking whether both stacking port states are "really-down" (block 922). If so, port analysis component 910(X) can determine that the link between the two ports is faulty/broken (block 924) and can proceed to the end of the current loop iteration at block 914 (thereby ending the processing for CE1). This situation may occur if, e.g., the cable connecting the two ports is faulty, or if the system administrator has not connected any cable between the two ports at all. The latter case is not a problem if it is intentional.

Otherwise, port analysis component 210(X) can move on to checking whether the neighbor port field of CE1 is NULL or the neighbor port state is aged-out, and whether the neighbor port state of CE2 is recently-refreshed (block 926). If so, port analysis component 210(X) can determine that there is a unidirectional link from the stacking port to the neighbor port of CE1 (block 928) and can proceed to the end of the current loop iteration at block 914 (thereby ending the processing for CE1).

Otherwise, port analysis component 210(X) can move on to checking whether the neighbor port state of CE1 is recently-refreshed and the neighbor port state of CE2 is aged-out (block 930). If so, port analysis component 910(X) can determine that there is a unidirectional link from the neighbor port to the stacking port of CE1 (block 928) and can proceed to the end of the current loop iteration at block 914 (thereby ending the processing for CE1).

Finally, if none of the foregoing conditions are met, port analysis component 210(X) can check whether the neighbor port states for both CE1 and CE2 are aged-out (block 932). If so, port analysis component 210(X) can determine that there is no communication on this link (block 936). This is typically not due to a faulty/broken/unconnected cable as in block 924; instead, this situation may be due to a chip or firmware problem. Port analysis component 210(X) can then proceed to the end of the current loop iteration at block 914 (thereby ending the processing for CE1).

Returning now to FIG. 9A, if device record DR2 is not found at block 908, port analysis component 210(X) can check whether the neighbor port field of CE1 is NULL (block 910). If the neighbor port field is NULL, this case is considered to be normal and the current loop iteration can end (block 914).

On the other hand, if the neighbor port field is not NULL, port analysis component 210(X) can determine that there is a unidirectional link from the neighbor port to the stacking port of CE1 if the neighbor port state of CE1 is recently-refreshed and the stacking port state of CE1 is really-up (block 912). Finally, the current loop iteration can end (block 914) and port analysis component 210(X) can repeat loop 902 until all of the connection entries in DR1 have been processed.

With flowchart 900, each port analysis component 210(X) can correctly identify the three types of port/link problems described previously, as long as there is at least one path between any two stackable switches in stacking system 200 (so that every switch can know the port statuses of every other switch via the propagation of device records). If the port/link problem prevents communication between at least two stackable switches, then flowchart 900 may not be sufficient to accurately distinguish between the three types of problems because one switch may not have updated port status information for one or more of the other switches in the stacking system.

It should be appreciated that flowchart 900 of FIGS. 9A and 9B is illustrative and not intended to limit embodiments of the present invention. For example, in scenarios where detection of the one-end-up, one-end-down problem is not needed or desired, there is no need to check (or even maintain) the port age field in each connection entry. In these embodiments, the possible stacking port states can be reduced to "really-up" and "really-down."

Further, in terms of the interaction between the problem detection algorithm of FIGS. 9A/9B and the previous flowcharts of FIGS. 4-8, in certain embodiments the record serial number for a device record may only be updated in response to a change to the port age or neighbor age fields (per block 614 of FIG. 6) if that change results in a change to stacking port or neighbor port state (e.g., from transit-up to really-up, etc.). This optimization can reduce the frequency with which the record serial number needs to be updated. In these embodiments, other events unrelated to the port age and neighbor age fields (e.g., adding/removing stacking ports, changing the message field, etc.) will still cause the record serial number to be incremented.

5. Resolving Port/Link Problems

Figure 10:
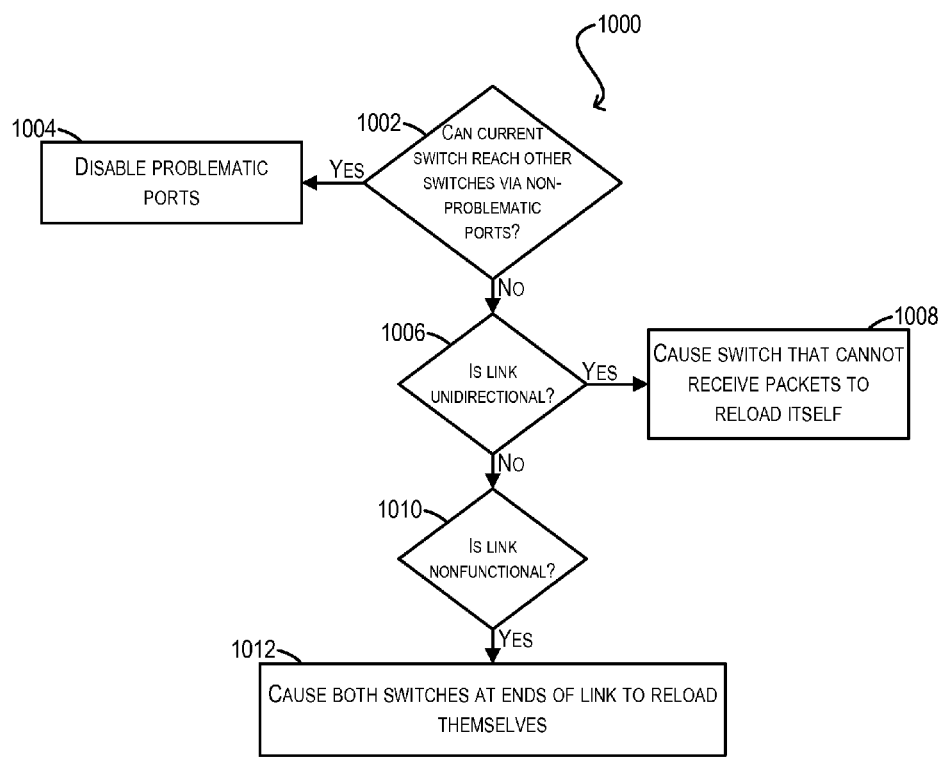
FIG. 10 depicts a flowchart for automatically resolving a detected port/link problem according to an embodiment.

Once port analysis component 210(X) for a given stackable switch 202(X) has detected a port/link problem per the algorithm of FIGS. 9A and 9B, component 210(X) can (depending on the nature of the problem) also take steps to resolve/correct the problem without requiring any human intervention. FIG. 10 depicts a flowchart 1000 of such a process according to an embodiment.

Starting with block 1002, port analysis component 210(X) can determine whether stackable switch 202(X) can reach the other switches of stacking system 200, without using the problematic ports that were identified via the detection algorithm of FIGS. 9A/9B. If so, port analysis component 210(X) can simply disable the problematic ports and flowchart 1000 can end. By disabling the problematic ports, port analysis component 210(X) can physically bring down those ports, causing the ports to transition to a DOWN status. This, in turn, will cause all of the switches in stacking system 200 will recalculate their forwarding paths in a manner that avoids use of the disabled ports.

If stackable switch 202(X) cannot reach all of the other switches using non-problematic ports, port analysis component 210(X) can check whether the problematic port is part of a unidirectional link (block 1006). If so, port analysis component 210(X) can cause the switch that cannot receive packets on the link to reload itself (block 1008). This action assumes that the port problem is a software issue (e.g., a port firmware bug, etc.) that will disappear after the reload. This action may not remedy the situation if the port problem is caused by a hardware issue (e.g., a faulty cable or hardware chip, etc.).

If the link is not unidirectional, port analysis component 210(X) can then move on to checking whether the link is completely nonfunctional (block 1010). If so, port analysis component 210(X) can cause the switches at both ends of the link to reload themselves (block 1012). As noted with respect to block 1008, this action may clear the problem if it was caused by a software issue, but may have no effect if it was caused by a hardware issue. Flowchart 1000 can subsequently end. If the problem is still not resolved at this point, port analysis component 210(X) may, e.g., generate an error or log entry indicating that the problem could not be automatically corrected.

Although not shown in FIG. 10, in scenarios where a switch needs to reload itself (e.g., in response to blocks 1008 and 1012), the switch can setup a timer to delay the reload for X number of seconds. The switch can then add a reload message to its device record (using, e.g., the general purpose message field), increment the record serial number, and send out a probe packet with the updated device record on all stacking ports. In this manner, the switch can inform the other switches in the stacking system that it is planning to reload. This is useful if, e.g., two switches need to reload at approximately the same time, since they can coordinate their reloads to overlap (and thereby avoid two rounds of such reloads). This can also allow the master switch in the stacking system to log information regarding the reload actions.

As noted above, the reload solution assumes that the detected port/link problem is a software issue and thus can be resolved by reloading the software of the switch. In cases where the port/link problem is actually a hardware issue, certain enhancements to flowchart 1000 of FIG. 10 can be implemented to avoid repeated reloading. For example, in one embodiment, port analysis components 210(1)-210(M) may require that each switch of the stacking system reach a stable/operational condition before being allowed to take the reload remedy at a later point in time (e.g., in response to a later detected port/link problem). This reduces the likelihood that the port/link problem is due to a hardware issue that cannot be resolved via a reload.

6. Exemplary Network Switch

Figure 11:
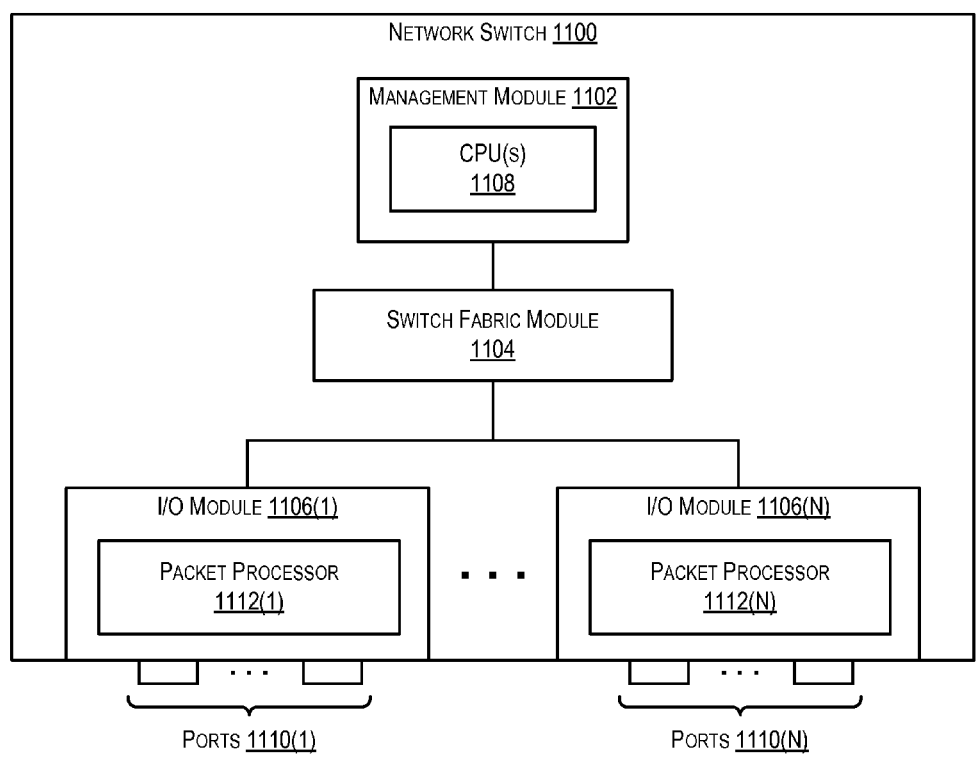
FIG. 11 depicts a network switch according to an embodiment.

FIG. 11 depicts a network switch 1100 according to an embodiment. Network switch 1100 can be used to implement any of the stackable switches/devices described in the foregoing disclosure, such as stackable switches 200(1)-200(M) of FIG. 2.

As shown, network switch 1100 includes a management module 1102, a switch fabric module 1104, and a number of I/O modules 1106(1)-1106(N). Management module 1102 represents the control plane of network switch 1100 and thus includes one or more management CPUs 1108 for managing/controlling the operation of the device. Each management CPU 1108 can be a general purpose processor, such as a PowerPC, Intel, AMD, or ARM-based processor, that operates under the control of software stored in an associated memory (not shown).

Figure 1B:
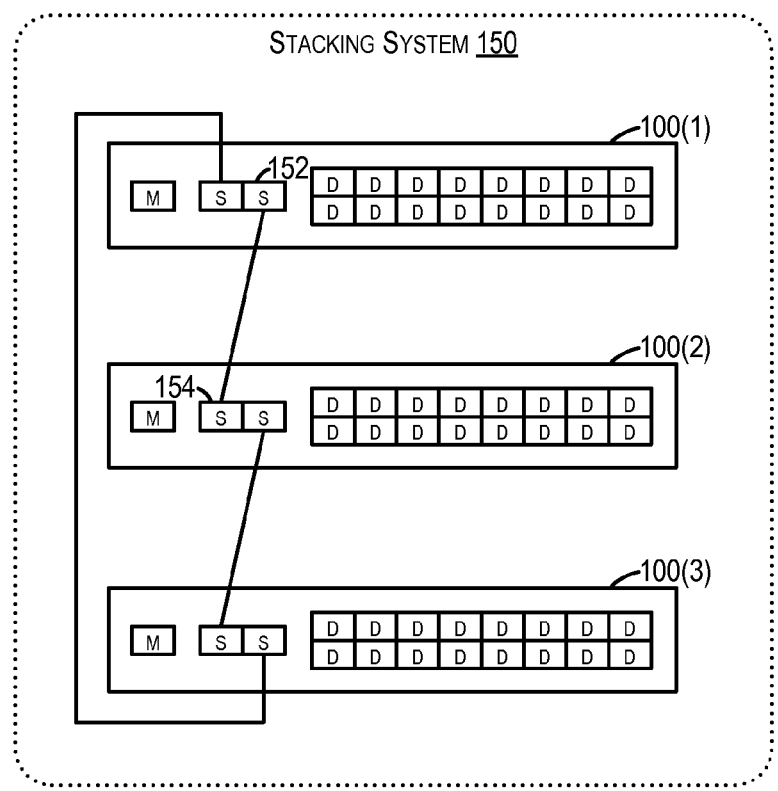
FIG. 1B depicts an exemplary stacking system.

Switch fabric module 1104 and I/O modules 1106(1)-1106(N) collectively represent the data, or forwarding, plane of network switch 1100. Switch fabric module 1104 is configured to interconnect the various other modules of network switch 1100. Each I/O module 1106(1)-1106(N) can include one or more input/output ports 1110(1)-1110(N) that are used by network switch 1100 to send and receive data packets. As noted with respect to FIGS. 1A and 1B, ports 1110(1)-1110(N) can comprise data ports for communicating with hosts/other network devices, as well as stacking ports for communicating with other switches in the same stacking system. Each I/O module 1106(1)-1106(N) can also include a packet processor 1112(1)-1112(N). Packet processor 1112 (1)-1112(N) is a hardware processing component (e.g., an FPGA or ASIC) that can make wire speed decisions on how to handle incoming or outgoing data packets.

It should be appreciated that network switch 1100 is illustrative and not intended to limit embodiments of the present invention. Many other configurations having more or fewer components than switch 1100 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method performed by a device in a system of devices, the method comprising:
   creating, by the device, a first record that includes port information pertaining to one or more ports of the device, wherein the one or more ports are usable for communicatively coupling the device to other devices in the system of devices, and wherein the first record includes, for each port in the one or more ports, a connection entry comprising a port identifier field and a neighbor port identifier field;
   receiving, by the device, one or more second records from the other devices in the system of devices, the one or more second records including port information pertaining to ports of the other devices;
   processing, by the device, each of the one or more second records by:
      determining an identity of an egress port on which the second record was sent out;
      determining an identity of an ingress port of the device on which the second record was received;
      determining a first connection entry of the first record whose port identifier field matches the identity of the ingress port; and
      populating the neighbor port identifier field of the first connection entry with the identity of the egress port, thereby recording, in the first connection entry, the egress port on which the second record was sent out as being a neighbor of the ingress port on which the second record was received;
   storing, by the device, the first record and the one or more second records in a data store maintained locally on the device;
   forwarding, by the device, copies of the first record and the one or more second records out of each of the one or more ports, the forwarding causing the copies of the first record and the one or more second records to be communicated to the other devices in the system of devices; and
   detecting, based on the first record and the one or more second records stored in the data store, a problem associated with a port in the one or more ports, wherein the problem prevents the port, or a neighbor port of the port, from sending or receiving data packets.

2. The method of claim 1 where the port information included in the first record further comprises, for each port in the one or more ports:
   a status of the port.

3. The method of claim 1 wherein the port information included in the first record further comprises, for each port in the one or more ports:
   a port age indicating an amount of time since the status of the port last changed; and
   a neighbor age indicating an amount of time since a record was last received from a neighbor port on the port.

4. The method of claim 1 wherein the first record further includes a message indicating an action that has been or will be performed by the device.

5. The method of claim 1 wherein storing the one more second records in the data store comprises, for each second record:
   determining a record serial number associated with the second record;
   determining a record serial number associated with a copy of the second record already stored in the data store, if such a stored copy exists; and
   storing the second record in the data store if the record serial number associated with the second record is greater than the record serial number associated with the stored copy.

6. The method of claim 1 further comprising:
   monitoring for events that affect the port information included in the first record; and
   updating the first record in response to the events.

7. The method of claim 6 wherein the one or more events include:
   a port status change,
   an addition or removal of a port in the one or more ports; or
   a passage of a predetermined time interval.

8. The method of claim of claim 1 wherein the detected problem is:
   a problem where the port completely loses communication with its neighbor port;
   a problem where a link between the port and its neighbor port becomes unidirectional; or
   a problem where one end port of the link is up and the other end port of the link is down.

9. The method of claim 1 wherein the detecting takes into account a transit time for successfully transmitting packets between the devices in the system of devices.

10. The method of claim 1 further comprising:
    resolving the detected problem without human intervention.

11. The method of claim 10 wherein resolving the detected problem without human intervention comprises:

determining if the device can communicate with the other devices in the system of devices via other, non-problematic ports; and if so, disabling the port that is affected by the detected problem.

12. The method of claim 11 wherein resolving the detected problem without human intervention further comprises:

if the device cannot communicate with the other devices via other, non-problematic ports, causing one or more devices in the system of devices to automatically reload themselves.

13. The method of claim 1 wherein the device is a stackable switch, wherein the one or more ports are stacking ports of the stackable switch, and wherein the system of devices is a stacking system.

14. The method of claim 1 wherein, upon creation of the first record, the neighbor port identifier field is initialized with an empty or null value.

15. A device for use in a system of devices, the device comprising:

a processor;

one or more ports for communicatively coupling the device to other devices in the system of devices; and a non-transitory computer readable medium having stored thereon program code which, when executed by the processor, causes the processor to:

create a first record that includes port information pertaining to the one or more ports, wherein the first record includes, for each port in the one or more ports, a connection entry comprising a port identifier field and a neighbor port identifier field;

receive one or more second records from the other devices in the system of devices, the one or more second records including port information pertaining to ports of the other devices;

process each of the one or more second records by:

determining an identity of an egress port on which the second record was sent out;

determining an identity of an ingress port of the device on which the second record was received;

determining a first connection entry of the first record whose port identifier field matches the identity of the ingress port; and populating the neighbor port identifier field of the first connection entry with the identity of the egress port, thereby recording, in the first connection entry, the egress port on which the second record was sent out as being a neighbor of the ingress port on which the second record was received;

store the first record and the one or more second records in a data store maintained locally on the device;

forward copies of the first record and the one or more second records out of each of the one or more ports, the forwarding causing the copies of the first record and the one or more second records to be communicated to the other devices in the system of devices; and detect, based on the first record and the one or more second records stored in the data store, a problem associated with a port in the one or more ports, wherein the problem prevents the port, or a neighbor port of the port, from sending or receiving data packets.

16. The device of claim 15 wherein the program code further causes the processor to:

resolve the detected problem without human intervention.

17. A non-transitory computer readable medium having stored thereon program code executable by a processor of a device for use in a system of devices, the program code comprising:

code that causes the processor to create a first record that includes port information pertaining to one or more ports of the device, wherein the plurality of ports are useable for communicatively coupling the device to other devices in the system of devices, and wherein the first record includes, for each port in the one or more ports, a connection entry comprising a port identifier field and a neighbor port identifier field;

code that causes the processor to receive one or more second records from the other devices in the system of devices, the one or more second records including port information pertaining to ports of the other devices;

code that causes the processor to process each of the one or more second records by:

determining an identity of an egress port on which the second record was sent out;

determining an identity of an ingress port of the device on which the second record was received;

determining a first connection entry of the first record whose port identifier field matches the identity of the ingress port; and populating the neighbor port identifier field of the first connection entry with the identity of the egress port, thereby recording, in the first connection entry, the egress port on which the second record was sent out as being a neighbor of the ingress port on which the second record was received;

code that causes the processor to store the first record and the one or more second records in a data store maintained locally on the device;

code that causes the processor to forward copies of the first record and the one or more second records out of each of the one or more ports, the forwarding causing the copies of the first record and the one or more second records to be communicated to the other devices in the system of devices; and code that causes the processor to detect, based on the first record and the one or more second records stored in the data store, a problem associated with a port in the one or more ports, wherein the problem prevents the port, or a neighbor port of the port, from sending or receiving data packets.

18. The non-transitory computer readable medium of claim 17 wherein the program code further comprises:

code that causes the processor to resolve the detected problem without human intervention.

\* \* \* \* \*